Oct. 18, 1955 P. W. WEBSTER 2,721,094
CLOSURE FASTENER FOR PRESSURE CONTAINER
Filed Oct. 29, 1952 2 Sheets-Sheet 1
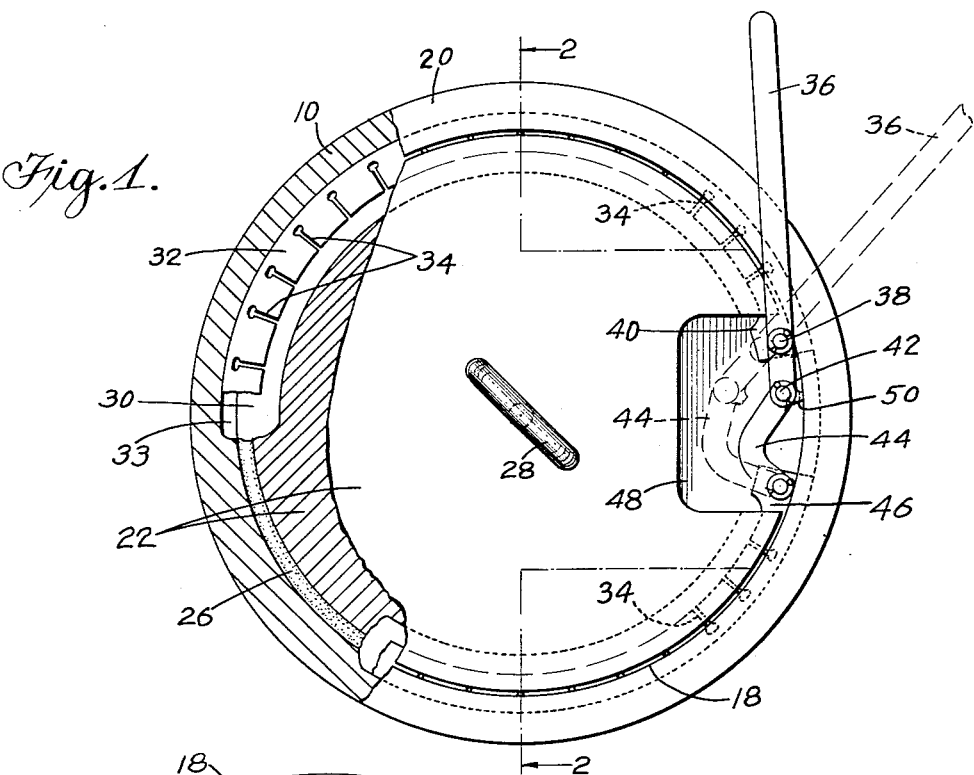
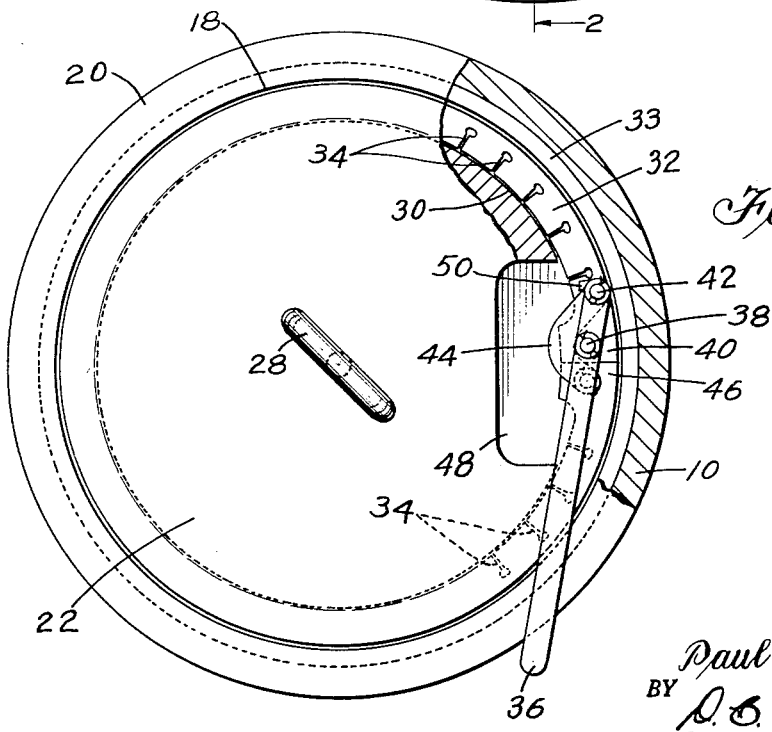
INVENTOR.
Paul W. Webster.
BY
ATTORNEYS.

Oct. 18, 1955        P. W. WEBSTER        2,721,094
CLOSURE FASTENER FOR PRESSURE CONTAINER

Filed Oct. 29, 1952        2 Sheets-Sheet 2

INVENTOR.
Paul W. Webster.
BY D. C. Snyder
A. R. McCrady
ATTORNEYS.

2,721,094
Patented Oct. 18, 1955

2,721,094
CLOSURE FASTENER FOR PRESSURE CONTAINER

Paul W. Webster, Pasadena, Calif.

Application October 29, 1952, Serial No. 317,604

3 Claims. (Cl. 292—256.69)

(Granted under Title 35, U. S. Code (1952), sec. 266)

The invention described herein may be manufactured and used by or for the Government of the United States of America for governmental purposes without the payment of any royalties thereon or therefor.

This invention relates to a container for fluid under high pressure, and more particularly to a pressure container having a closure which may be readily applied and removed when the container is empty.

The invention contemplates a high pressure container having a cylindrical opening closed by a circular cover which is held in place by a flexible ring which rides in mating slots in the opening and cover. The ring may be flexed, by toggle means, from an expanded position wherein the cover is locked in place, to a contracted position, wherein the cover may be inserted or removed.

An object of the invention is to provide a container of the type indicated having a closure which is capable of resisting pressures of the order of thousands of pounds per square inch, and yet is insertible and removable with slight effort and without the use of tools.

A further object of the invention is to provide a container and closure wherein the internal pressure exerted upon the closure is resisted in shear by a flexible ring which is readily flexed from one operative position to another, yet has high shear strength.

Other objects and many of the attendant advantages of this invention will be readily appreciated as the same becomes better understood by reference to the following description.

Fig. 1 is an end elevation of a device embodying the invention, showing the closure mechanism in expanded position;

Fig. 3 is a view similar to Fig. 1 but showing the closure mechanism in contracted position.

Figure 2:
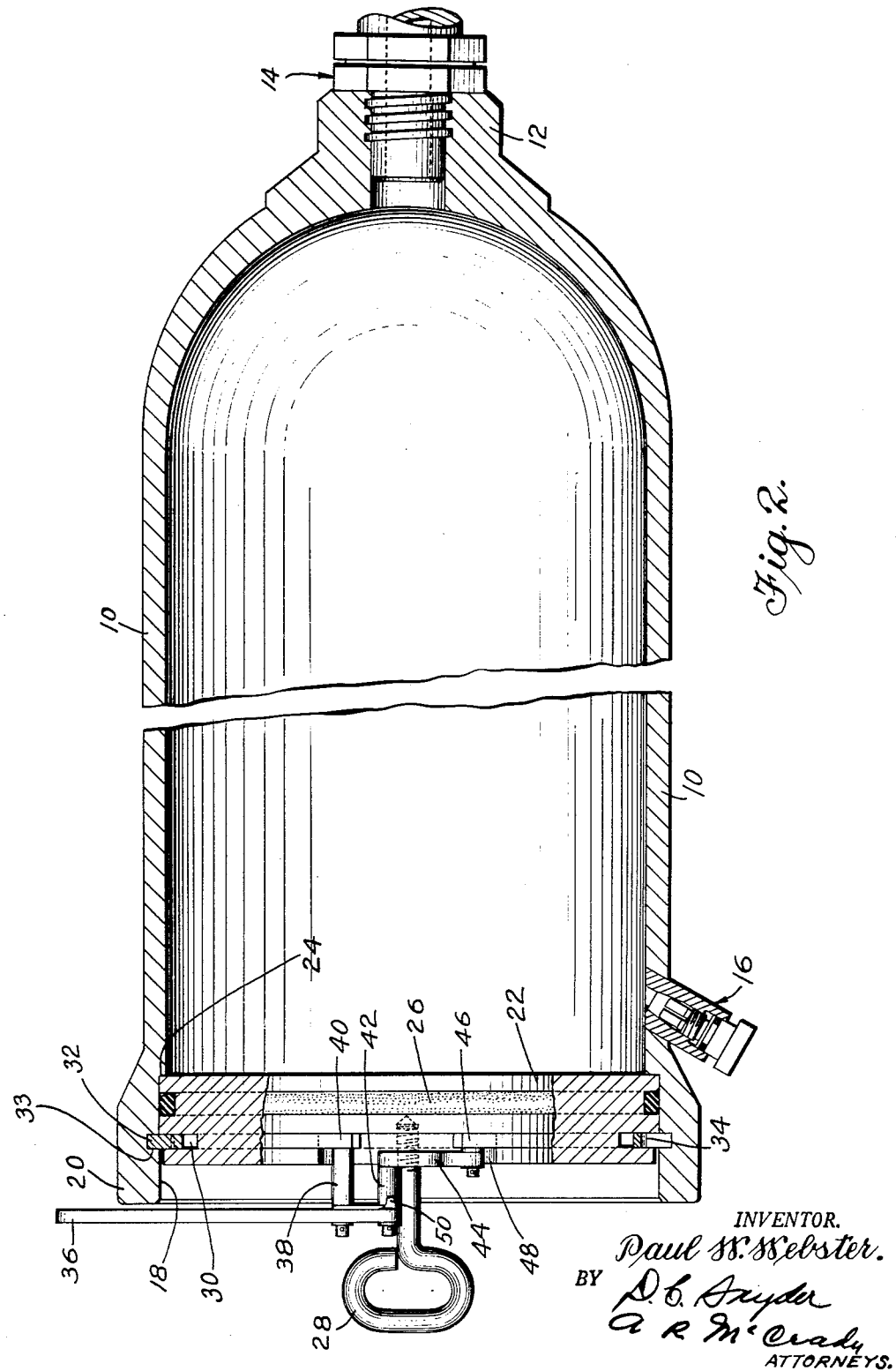
Fig. 2 is a view in longitudinal section of the device, corresponding generally to a section taken on the line 2—2 of Fig. 1.

The container shown by way of example in the drawing is a cylindrical flask for high pressure fluid, having cylindrical walls 10 which terminate in an outlet 12 having any suitable type of outlet or dispensing mechanism indicated generally at 14. Inlet mechanism for use in charging the flask is indicated generally at 16. The flask terminates in a cylindrical bore 18 and a circular rim 20. Within the bore is removably positioned a circular cover 22 which seats against an annular shoulder 24 and is provided with an annular seal 26 of known type, to prevent escape of pressure fluid therepast. The cover may be provided with a ring or handle 28, for easy handling.

The cover 22 is formed with an annular peripheral groove 30, in which is fitted an expansible ring 32, preferably of steel or other metal. The bore 18 is formed with a mating groove 33 which registers with groove 30 when the cover is in place. The ring 32 is of substantial thickness to enable it to withstand the heavy shearing stresses to which it is subjected, but is made easily flexible by means of radial slots, which may be of the shape indicated at 34.

Toggle mechanism is provided for moving the ring 32 from the expanded position, shown in Figs. 1 and 2, in which it locks the cover 22 in place, to the contracted position, shown in Fig. 3, in which it leaves the cover free to be moved into and out of the flask. The toggle mechanism comprises an operating lever 36 disposed in a plane beyond the rim 20 (Fig. 2) so that the rim will not interfere with its movement. The lever is pivoted by means of an elongated stud 38 to one end 40 of the ring 32, and its inner end is pivoted by means of a similar stud 42 to a link 44 which in turn is pivoted to the other end 46 of the ring. The cover 22 is milled out as indicated at 48 to permit the link 44 to swing inwardly as lever 36 is moved from the expanded position shown in Fig. 1 to the contracted position shown in Fig. 2, or vice versa.

The inner end of lever 36 is provided with a finger 50 which, when the parts are positioned as shown in Fig. 1, projects outwardly and contacts the bore 18 to form a stop when the toggle is slightly past dead center. In the position of the parts shown in Fig. 3, the link 44 contacts the pin 38 to limit further movement of the toggle when it is slightly past dead center.

In the operation of the device, it may be assumed that the cover 22 has been removed for inspection or cleaning of the flask, and that the ring 32 is in position in the groove 30 of the cover. In order to move the ring to its contracted position, the operator will first move the lever 36 to the position shown in Fig. 3. It will be noted that in both of Figs. 1 and 3 the toggle mechanism will remain in whichever of the ring-expanding or ring-contracting positions to which it is moved, unless forcibly moved therefrom by manipulation of lever 36. In the position shown in Fig. 3, the ring is in contracted position, wherein it will clear the bore 18, so that the cover 22 can be moved into the position shown in Fig. 2. The operator will thereupon move the lever 36 to the position shown in Fig. 1, causing the toggle mechanism to expand the ring into the locking position shown in Fig. 2, wherein the ring lies partly in the slot 30 and partly in the slot 33. By reversing the steps just described, the ring may be contracted to permit removal of the cover.

Obviously many modifications and variations of the present invention are possible in the light of the above teachings. It is therefore to be understood that within the scope of the appended claims the invention may be practiced otherwise than as specifically described.

What is claimed is:

1. A pressure container having a cylindrical bore terminating in an open end and formed with an annular inner groove, a disk axially slidable in said bore and formed with a peripheral groove, a flexible shear ring formed with radial slots and movable to a contracted position wherein it is wholly contained in the groove in the disk but expandible to a position wherein its periphery projects into the groove in the bore to thereby prevent axial movement of the disk in either direction, and toggle mechanism mounted on said disk and operative to move said ring to and from said positions and including a handle movable in a plane parallel to the disk and lying beyond said open end.

2. The invention defined in claim 1, wherein said radial slots extend outwardly from the inner surface of the ring and terminate in enlarged heads to increase the flexibility of the ring without greatly decreasing its shear strength.

3. The invention defined in claim 1, wherein said grooves are of rectangular cross section and of equal thickness, and the shear ring is of rectangular cross section and of a thickness to fit slidably in said grooves.

References Cited in the file of this patent

UNITED STATES PATENTS

| | | |
|---|---|---|
| 1,423,157 | Schwarz et al. | July 18, 1922 |
| 1,734,236 | Smith | Nov. 5, 1929 |
| 2,352,192 | Gasche | June 27, 1944 |
| 2,399,327 | Cullen | Apr. 30, 1946 |
| 2,616,587 | Petch | Nov. 4, 1952 |

FOREIGN PATENTS

| | | |
|---|---|---|
| 154,699 | Great Britain | Dec. 2, 1920 |